US012085908B2

(12) United States Patent
Walsh et al.

(10) Patent No.: US 12,085,908 B2
(45) Date of Patent: Sep. 10, 2024

(54) CONTROL SYSTEM BYPASSING FOR INDUSTRIAL COLD STORAGE

(71) Applicant: CrossnoKaye, Santa Barbara, CA (US)

(72) Inventors: Daniel Walsh, Santa Barbara, CA (US); Thomas Foley, Goleta, CA (US); Jesse Crossno, Santa Barbara, CA (US); Bryan Kaye, Santa Barbara, CA (US)

(73) Assignee: CROSSNO & KAYE, INC., Santa Barbara, CA (US)

( * ) Notice: Subject to any disclaimer, the term of this patent is extended or adjusted under 35 U.S.C. 154(b) by 402 days.

(21) Appl. No.: 17/121,469

(22) Filed: Dec. 14, 2020

(65) Prior Publication Data

US 2021/0180806 A1 Jun. 17, 2021

Related U.S. Application Data

(60) Provisional application No. 62/947,848, filed on Dec. 13, 2019.

(51) Int. Cl.
*G05B 19/042* (2006.01)
(52) U.S. Cl.
CPC .............. *G05B 19/0425* (2013.01)
(58) Field of Classification Search
CPC ............. G05B 19/0425; G05B 11/42; G05B 2219/2654; G05B 19/0426; G06Q 10/0832; Y02P 80/10; Y02P 90/80
See application file for complete search history.

(56) References Cited

U.S. PATENT DOCUMENTS

| 8,417,391 B1 | 4/2013 | Rombouts et al. |
| 10,323,878 B1 * | 6/2019 | Woolf .................. G05B 13/042 |

(Continued)

FOREIGN PATENT DOCUMENTS

| CN | 104776553 A | 7/2015 |
| CN | 107091549 A | 8/2017 |

(Continued)

OTHER PUBLICATIONS

International Search Report and Written Opinion as issued in connection with International Patent Application No. PCT/US2020/064922, mailed Mar. 19, 2021, 11 pages.

(Continued)

*Primary Examiner* — Kenneth M Lo
*Assistant Examiner* — Mohammed Shafayet

(57) ABSTRACT

Some embodiments include a control bypass system for industrial cold storage facilities. In some embodiments, the control bypass system includes a cloud scheduler and a bypass controller. The cloud scheduler may be located in a remote location. The cloud scheduler may create a power draw prescription for one or more items of cold storage equipment at the industrial cold storage facility. The power draw prescription, for example, can include a desired power draw level for one or more items of cold storage equipment at the industrial cold storage facility and the desired power draw level changes over a period of time. The bypass controller can be located at the industrial cold storage facility and receives the power draw prescription from the cloud scheduler, produces an environmental setpoint for the one or more items of equipment, and outputs the environmental setpoint to a device or system controller.

17 Claims, 12 Drawing Sheets

(56) References Cited

U.S. PATENT DOCUMENTS

| | | | |
|---|---|---|---|
| 10,503,161 B1 | 12/2019 | Foley et al. | |
| 2003/0177776 A1* | 9/2003 | Ghent | G06Q 10/06 |
| | | | 236/46 R |
| 2015/0135737 A1* | 5/2015 | Cresswell | F25D 11/003 |
| | | | 62/190 |
| 2016/0056628 A1 | 2/2016 | Burstall et al. | |
| 2016/0138856 A1 | 5/2016 | Wilson | |
| 2018/0293864 A1 | 10/2018 | Wedig et al. | |
| 2018/0356790 A1 | 12/2018 | Vartak et al. | |
| 2018/0356806 A1 | 12/2018 | Dave et al. | |
| 2019/0323767 A1* | 10/2019 | Meyers | G05D 23/20 |
| 2021/0063043 A1* | 3/2021 | Yang | F24F 11/84 |

FOREIGN PATENT DOCUMENTS

| | | |
|---|---|---|
| WO | 2005041326 A2 | 5/2005 |
| WO | 2015028072 A1 | 3/2015 |

OTHER PUBLICATIONS

First Office Action of CN Application No. 202080086216.8 mailed on Nov. 24, 2023, 22 pages.

Examination Report in AU Patent application No. 2020401389 dated May 29, 2023, 4 pages.

* cited by examiner

CONTROL SYSTEM BYPASSING FOR INDUSTRIAL COLD STORAGE

BACKGROUND

A successful control system may have sufficient sensor data as well as direct control over the equipment it is meant to control. There are situations, however, in which it is not possible to directly set the output of a controller (e.g., the speed of an electric motor, the position of a valve, the electrical current through a heater, the flow rate of a pump, etc.). There are a number of scenarios where direct control may not be possible. For example, an existing control system may already have been installed and may offer the only feasible interface through which to communicate desired actions to the equipment. In addition, a cold storage facility may be able to sense and control environmental parameters within the cold storage facility.

SUMMARY

Some embodiments include a system comprising: a cloud scheduler located in a remote location; and a bypass controller that receives power draw profiles from the cloud scheduler and outputs environmental setpoints to a device or system controller.

Some embodiments include a method comprising: receiving a power draw prescription from a cloud scheduler; converting the power draw prescription to a temperature setpoint; and communicating the temperature setpoint to a device or system controller.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

Some embodiments include a control bypass system for industrial cold storage facilities. In some embodiments, the control bypass system includes a cloud scheduler and a bypass controller. The cloud scheduler may be located in a remote location. The cloud scheduler may create a power draw prescription for one or more items of cold storage equipment at the industrial cold storage facility. The power draw prescription, for example, can include a desired power draw level for one or more items of cold storage equipment at the industrial cold storage facility and the desired power draw level changes over a period of time. The bypass controller can be located at the industrial cold storage facility and receives the power draw prescription from the cloud scheduler, produces an environmental setpoint for the one or more items of equipment, and outputs the environmental setpoint to a device or system controller. In some embodiments, the system controller comprises a PID controller.

Some embodiments may include a method comprising: receiving, at a bypass controller at an industrial cold storage facility, a power draw prescription from a remote server, the power draw prescription includes a desired power draw level for one or more items of cold storage equipment at the industrial cold storage facility, and the desired power draw level changes over a period of time; converting, at the bypass controller, the power draw prescription to a temperature setpoint for a portion of the cold storage facility based on a mathematical model of the one or more items of cold storage equipment; and communicating the temperature setpoint to a cold storage facility system controller that is coupled with the one or more items of cold storage equipment.

In some embodiments, the one or more items of cold storage equipment comprises one or more of a motor, a valve, a vessel, an evaporator, a condenser, a pump, a compressor, a door, an underfloor heating element, a light, defrost equipment, a centrifuge, and/or a furnace.

In some embodiments, the method may also include: receiving, at the bypass controller, temperature data from a temperature sensor at the portion of the cold storage facility; determining, at the bypass controller, whether the temperature data has exceeded or is approaching a threshold temperature value for the portion of the cold storage facility; and in the event the temperature data has exceeded or is approaching a threshold temperature value: producing a second temperature setpoint; and communicating the second temperature setpoint to the system controller.

Some embodiments include a bypass controller. The bypass controller may be in communication with a cloud controller and a device controller at an industrial cold storage facility. The bypass controller may include a transceiver that receives data from a cloud scheduler located in a location remote from the industrial cold storage facility and a processor. The processor may receive a power draw prescription for one or more items of cold storage equipment at the industrial cold storage facility, the power draw prescription includes a desired power draw level for one or more items of cold storage equipment at the industrial cold storage facility, and the desired power draw level changes over a period of time. The processor may produce an environmental setpoint for the one or more items of equipment. The processor may output the environmental setpoint to a device controller or a system controller.

In some embodiments, the processor may output the environmental setpoint via the transceiver. In some embodiments, the processor may output the environmental setpoint via an output that is separate and distinct from the transceiver.

BRIEF DESCRIPTION OF THE FIGURES

These and other features, aspects, and advantages of the present disclosure are better understood when the following Detailed Description is read with reference to the accompanying drawings.

DETAILED DESCRIPTION

In some embodiments, a successful control system may have sufficient environmental sensor data as well as direct control over the equipment it is meant to control. There are situations, however, in which it is not possible to directly set the output of a controller (e.g., the speed of an electric motor, the position of a valve, the electrical current through a heater, the flow rate of a pump, etc.). There are a number of scenarios where direct control may not be possible such as, for example, an existing control system has already been installed and offers the only feasible interface through which to communicate desired actions to the equipment. This may include, for example, interfacing with an existing control system may only allow push setpoints (e.g. temperature, pressure, etc.) rather than giving direct control over the output (e.g. motor speed, valve position, applied voltage, etc.).

As another example, some means of changing the state of equipment may not directly set the state, but may set the rate of change of the state. This may include, for example, a slide valve whose position is controlled by turning a rack and pinion mechanism (or a hydraulic actuated valve) to gradually increase or decrease the valve opening, which may set the rate of change of pressure within the vessel. In this case, a control action only directly affects the rate at which the valve opens, not the position of the valve itself.

As yet another example, some equipment maybe controlled by an equipment controller or a facility controller. These controllers may receive an environmental setpoint (e.g., temperature, pressure, humidity, etc.) and control the equipment based on an environmental setpoint. However, these controllers may not be able to control the equipment based on the power or energy requirements. And, for example, may not be able to do so while ensuring certain environmental parameters are maintained within appropriate thresholds.

Figure 1:
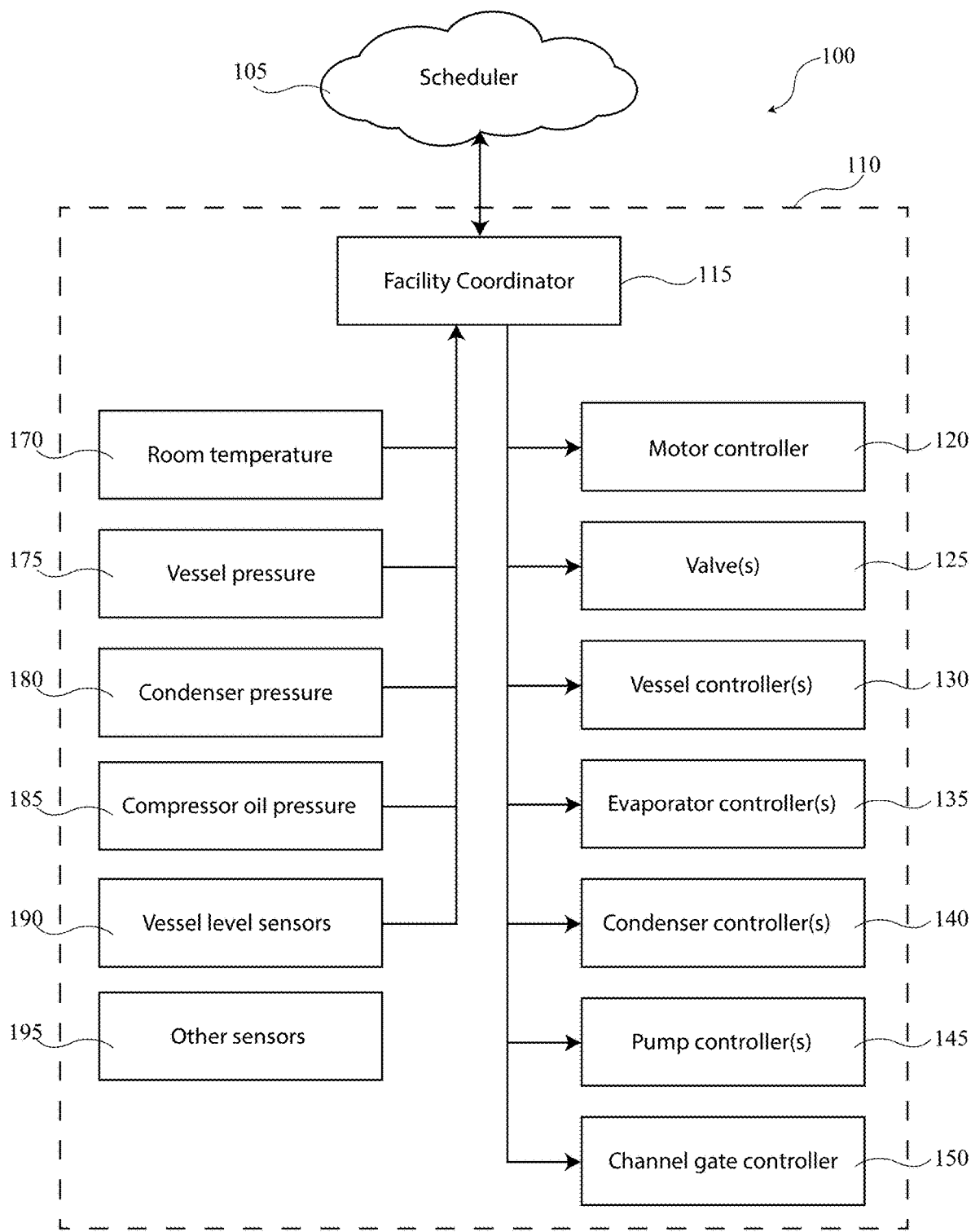
FIG. 1 is a block diagram of an industrial facility control system according to some embodiments.

FIG. 1 is a block diagram of an industrial facility control system 100 according to some embodiments such as, for example, as an industrial cold storage facility. In some embodiments, the industrial facility control system 100 includes a scheduler 105. The scheduler 105 may be a cloud-based computing system (e.g., Amazon Web Services, Google Cloud, Microsoft Azure, IBM Cloud, etc.) or a local computing system that can use various predictive techniques, which may be based on the state of the facility as determined based on data from various sensors within an industrial facility 110, to control various controllable devices, which may occur through an onsite facility coordinator or may occur directly from the cloud scheduler or both. In some embodiments, the scheduler 105 may include various algorithms that can be used to optimize the energy use according to various metrics such as, for example, based upon energy usage within the industrial facility 110.

In some embodiments, the industrial facility control system 100 includes an industrial facility 110 and a scheduler 105. The industrial facility 110 may include any type of facility that may include various subsystems and/or systems. For example, the industrial facility 110 may be a cold storage facility, a factory, a farm, a packing house, a dairy, a grow facility, a hydroponic facility, a warehouse, a distribution center, a cement manufacturing facility, oil and gas processing facilities, water treatment plants, oil refineries, petrochemical processing facilities, chemical processing facilities, natural gas processing facilities, crop irrigation, water districts, desalinization, etc.

In some embodiments, the industrial facility control system 100 may include a facility coordinator 115. The facility coordinator 115 may be in communication with the scheduler 105 via any network connection. In some embodiments, the network connection may be a wired connection such as, for example, via the Internet. In some embodiments, the communication channel between the facility coordinator 115 and the scheduler 105 may be initiated via a request from the facility coordinator 115. In some embodiments, the network connection may be a wireless connection such as, for example, a 4G or 5G network (or similar), an LTE network, a satellite network, etc.

In some embodiments, the industrial facility 110 may include any number of controllable devices such as, for example, motors 120 (e.g., fans, turbines, etc.), valves 125, vessels, evaporators, condensers, pumps, compressors, doors, underfloor heating elements, lighting, defrost equipment, centrifuges, furnaces, etc. In some embodiments, the controllable devices may be controlled by a device controller that interfaces with the facility coordinator 115. For example, a vessel may be controlled by a vessel controller 130; an evaporator may be controlled by an evaporator controller 135; a condenser may be controlled by a condenser controller 140; a pump may be controlled by a pump controller 145, a channel gate controller 150, valves may be controlled by a valve controller, and heaters/heating elements may be controlled by heater/heating element controllers, or an any other controllable device or controller. In some embodiments, these controllers may be coupled with the facility coordinator 115, may be integrated with the controllable device, and/or may or may not be designed by the manufacturer of the controllable device.

In some embodiments, the facility coordinator 115 may be in communication with each of the controllable devices and may provide commands to the various controllable devices.

In some embodiments, the industrial facility 110 may include any number of sensors such as, for example, a temperature sensor 170, a vessel pressure sensor 175, a condenser pressure sensor 180, a compressor oil pressure sensor 185, vessel level sensor 190, a humidity sensor, a fan speed sensor, a voltage sensor, or anemometer, flow meter, microphone, vibration sensor, pH meter, optical density meter, chemical concentration sensors, or any other sensor 195. The sensor may include any type of transducer that can translate physical properties into an electrical signal (either an analog or digital signal) that can be communicated to the facility coordinator 115 via a wired or wireless communication network. In some embodiments, the sensors may include any type of Internet of Things (IoT) device that can measure physical properties and communicate these properties to a network database such as, for example, at the facility coordinator 115.

In some embodiments, an industrial facility 110 may be a cold storage facility that may include any number of buildings. In some embodiments, an industrial facility 110 may include one or more cold storage buildings that use a vapor-compression refrigeration system to cool one or more rooms within the cold storage facility.

Figure 2:
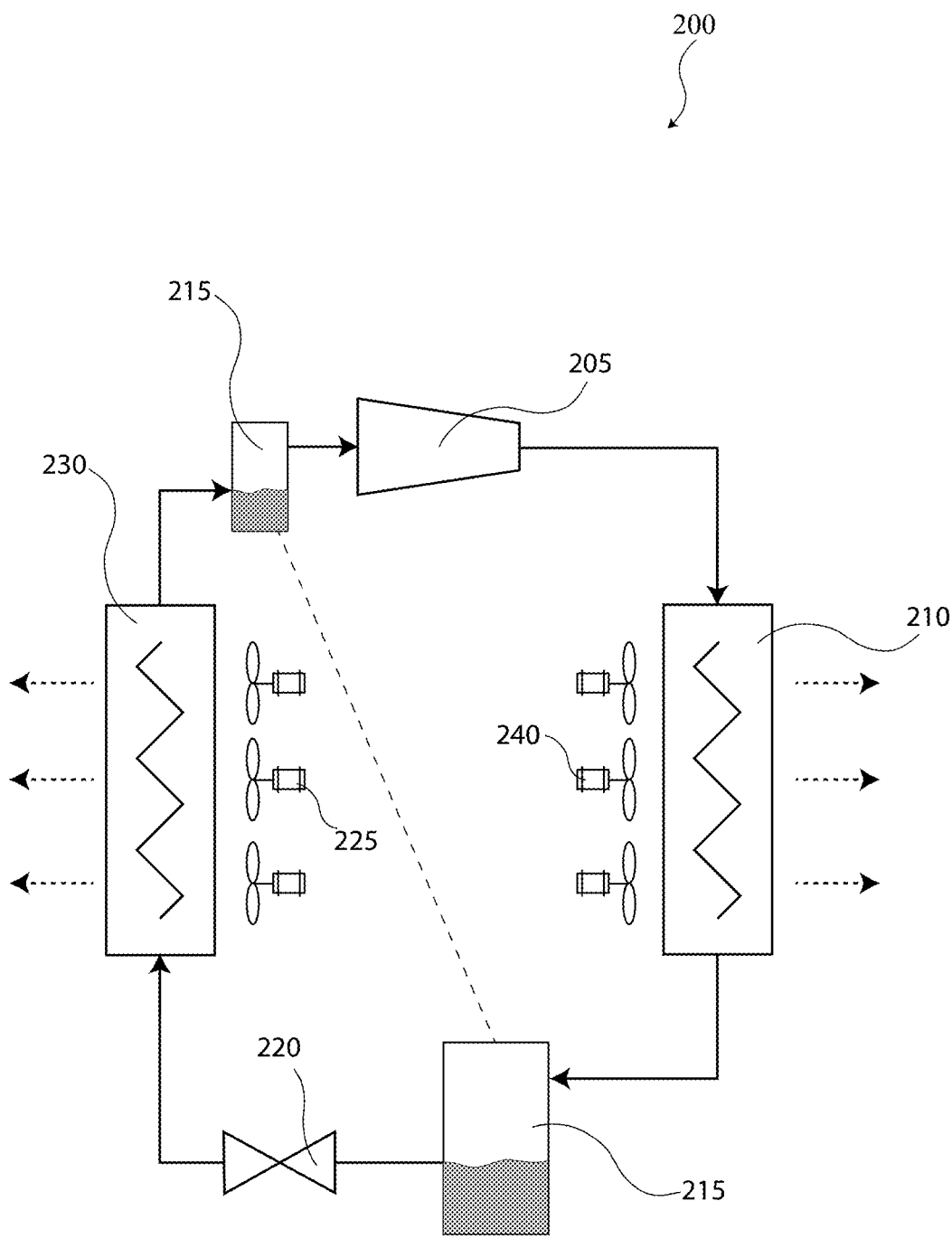
FIG. 2 is a block diagram of a direct expansion single stage vapor-compression refrigeration system according to some embodiments.

A block diagram of an example refrigeration system 200 is shown in FIG. 2. The refrigeration system 200 may include one or more compressors 205, one or more condensers 210, vessel 215 one or more expansion valves 220, one or more evaporators 230, a plurality of evaporator fans 225, and a plurality of condenser fans 240. In some embodiments, the condenser 210 may include the plurality of condenser fans 240. In some embodiments, the evaporate may include the plurality of evaporator fans 225. The vessel 215, while shown graphically as two vessels, may be a single vessel. In some embodiments, the vessel 215 may enclose the refrigerant in both vapor and liquid states. The liquid level within the vessel 215 may be vary based on various parameters.

In some embodiments, a circulating liquid refrigerant can be used in the refrigeration system 200 as the medium which absorbs and removes heat from a space to be cooled within the industrial facility 110 and subsequently rejects that heat elsewhere. The refrigeration system 200 may include a compressor 205, a condenser 210, a thermal expansion valve 220 (e.g., which also may be called a throttle valve or metering valve), an evaporator 230, or a vessel 215. The circulating refrigerant can enter the compressor 205 from the vessel 215 in the thermodynamic state known as a vapor (e.g., saturated vapor or non-saturated vapor) and is compressed to a higher pressure, resulting in a higher temperature as well. The hot, compressed vapor can then be in the thermodynamic state known as a superheated vapor and is at a temperature and pressure at which it can be condensed with either cooling water or cooling air flowing across coils or tubes in the condenser 210. This is where the circulating refrigerant can reject heat from the system. The rejected heat can be carried away by either the water or the air (whichever may be the case). The condenser fans 240, for example, can blow air across the condenser 210, which may warm the air carrying away the heat.

The condensed liquid refrigerant, in the thermodynamic state known as a saturated liquid, can then be returned to and held in vessel 215. The liquid refrigerant may then be routed through an expansion valve 220 where it undergoes an abrupt reduction in pressure. That pressure reduction may result in the adiabatic flash evaporation of a part of the liquid refrigerant. The auto-refrigeration effect of the adiabatic flash evaporation can lower the temperature of the liquid and vapor refrigerant mixture to where it is colder than the temperature of the enclosed space to be refrigerated; this may occur within the evaporator 230.

The cold mixture can be routed through coils or tubes in the evaporator 230. One or more evaporator fans 225 can circulate the warm air in the enclosed space across the coil or tubes carrying the cold refrigerant liquid and vapor mixture. That warm air evaporates the liquid part of the cold refrigerant mixture. At the same time, the circulating air is cooled and thus lowers the temperature of the enclosed space. The evaporator 230 is where the circulating refrigerant absorbs and removes heat which is subsequently rejected in the condenser 210 and transferred elsewhere by the water or air used in the condenser 210.

To complete the refrigeration cycle, the refrigerant vapor from the evaporator 230 is again a saturated vapor and is routed back into the compressor 205.

In some embodiments, the facility coordinator 115 may receive sensor data from one or more sensors. In some embodiments, the sensor data may be stored at the facility coordinator 115. In some embodiments, the sensor data may be communicated to the scheduler 105 and/or stored in a database in the cloud scheduler. In some embodiments, the sensor data may be stored at the facility coordinator 115 and communicated to the scheduler 105 on a predetermined cadence such as, for example, every minute, every few minutes, every 15 minutes, every hour, every day, every week, or every month. In some embodiments, the facility coordinator 115 may also communicate information such as the active prescription, corrective action applied, modifications to a prescription, etc. In some embodiments, the facility coordinator 115 may apply some corrective action based on the sensor data.

To control the facility, in some embodiments, the facility coordinator 115 may receive one or more prescriptions from the scheduler 105. A prescription may include one or more environmental, power or energy, process, or facility setpoints to be conducted or achieved by the facility coordinator 115. A prescription may be time varying and/or change over time. In some embodiments, the facility coordinator 115 may translate a prescription to achieve an environmental setpoint based on the specific devices, equipment, environment, controllers, etc. located within the industrial facility 110. In some embodiments, the facility coordinator 115 may receive abstract or broad facility prescriptions and translate these prescriptions into a translated prescription that may, for example, include actionable or specific commands, which may be manifested by changing environmental setpoints to equipment controllers and/or higher level control systems, individual device actuator signals, etc., and/or some combination thereof, and which can be implemented, applied, or executed within a specific facility. The facility coordinator 115 may translate a prescription from the scheduler 105 into a prescription that is actionable at the specific industrial facility 110 based on the various constraints and equipment at the specific industrial facility 110. In some embodiments, the scheduler 105 may perform some translation of the prescriptions prior to transmission to the facility coordinator 115.

In some embodiments, a prescription may be provided by the scheduler 105 to attempt to optimize energy use within the industrial facility 110. For example, a prescription may include an energy or a temperature setpoint for a specific industrial facility 110 and/or components or portions of the industrial facility 110 such as, for example, one or more rooms or one or more blast cells; a fan speed setpoint for one or more fans; a vessel pressure setpoint or a vessel level setpoint for one or more vessels, a compressor energy usage setpoint or a compressor speed setpoint for one or more compressors; a defrost time period or schedule, a duration of defrost sub events within a defrost event, a condenser pressure setpoint for one or more compressors, an irrigation channel gate position setpoint, a water pump power setpoint or a water pump speed setpoint for one or more water pumps, an irrigation line valve setpoint for one or more irrigation line valves, a fertilizer feed rate, a flow rate setpoint for one or water pumps, an industrial agitator motor speed setpoint for one or more motors, or a turbine speed setpoint, etc.

Figure 11:
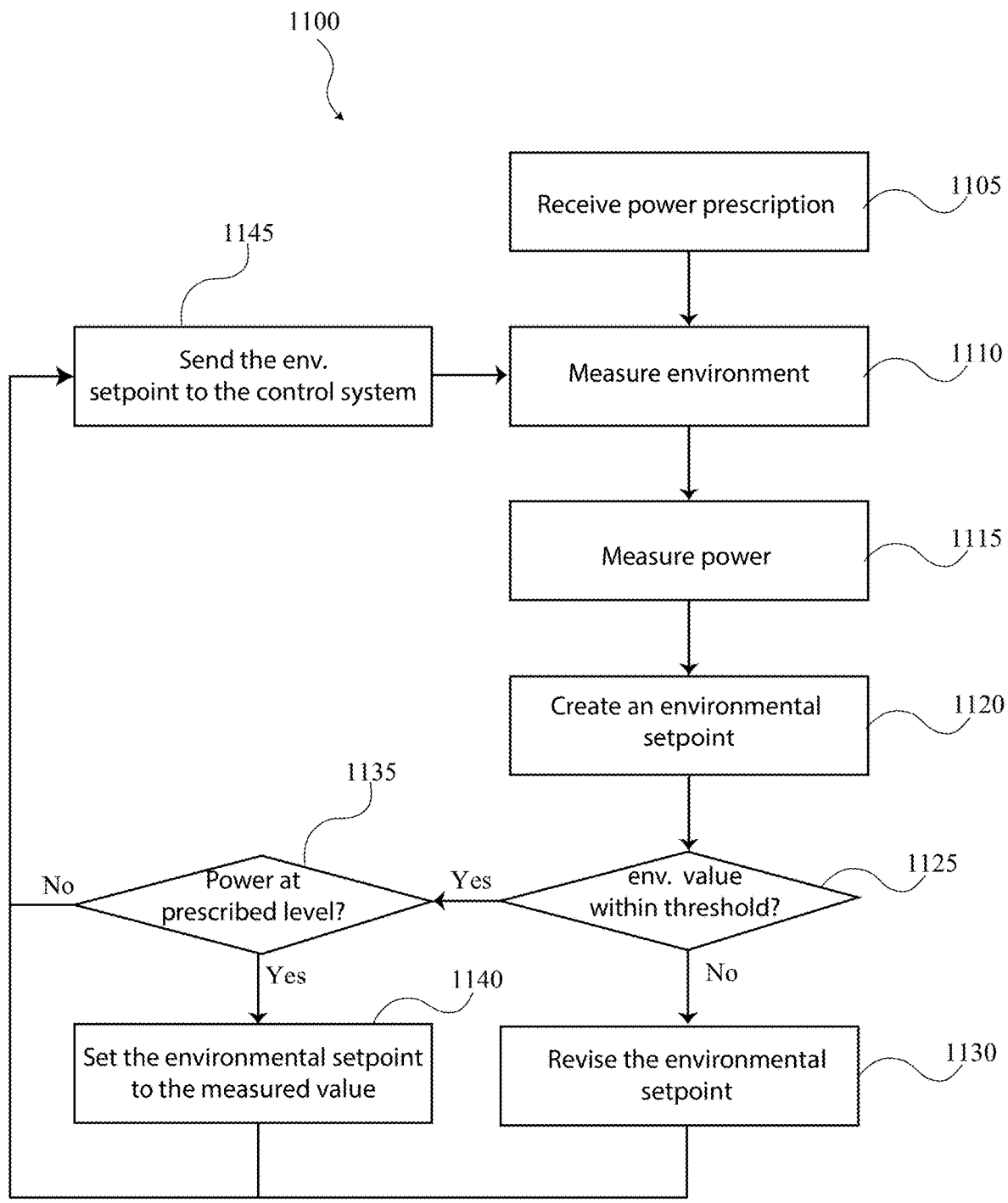
FIG. 11 is a flowchart of a process for bypass control system according to some embodiments.

In some embodiments, the facility coordinator can include all or a portion of the components of the computational system 1100 shown in FIG. 11.

In addition, in some embodiments, the facility coordinator 115 may receive one or more equipment constraints, operational constraints, or environmental constraints (collectively or individually "constraints") from the scheduler 105 or have one or more equipment constraints, operational constraints, or environmental constraints hard coded within the facility coordinator 115. The facility coordinator 115 may receive one or more constraints from the scheduler 105 at a given time and update the constraint at the facility coordinator 115. In some embodiments, constraints may be hard-coded within a given equipment or device, or hard-coded within the facility coordinator 115. In some embodiments, certain hard-coded constraints may not be modifiable remotely.

An equipment constraint, for example, may include a maximum vessel pressure, a minimum vessel pressure, a maximum vessel level, a minimum vessel level, a maximum compressor oil temperature, maximum compressor intake pressure, minimum compressor discharge pressure, minimum running compressor speed, a maximum condenser pressure, a maximum fan speed, a minimum running fan speed, etc. Any of the equipment constraints, for example, may be a function of operational, environmental, and other equipment states.

An environmental constraint, for example, may include a maximum temperature, a minimum temperature, a maximum humidity, a minimum humidity, maximum pressure, minimum pressure, lights on/off, etc. In some embodiments, an environmental constraint may be specific to a facility, a subsection of a facility, or a given room within a facility. In some embodiments, an environmental constraint may depend on a product, a product family, or a product type.

An operational constraint, for example, may include any type of constraint related to operations, or constraints that are not environmental constraints or equipment constraints. An operational constraint, for example, may include a constraint to periodically defrost certain pipes, lower the fan speeds during certain hours, lower or turn off the fans when a door is open or within a time period of being opened, quickly freeze certain items within a certain period of time, lights on time, lights off time, etc. The operational constraints, for example, may include time-based constraints.

In some embodiments, the constraints may be hierarchical. For example, a temperature constraint may override a constraint that limits the time period when fans are running. As another example, a vessel pressure constraint may override a fan speed constraint. As another example, an equipment constraint may override an operational constraint. As another example, an equipment maintenance schedule constraint may take precedent or have priority over a cooling power constraint. Constraints may take a hierarchy of priority, including immutable properties of a piece of equipment (e.g., a fan speed is bound by zero and its max rpm, the level of a vessel is bound by zero and the height of the vessel, etc.), environmental constraints (e.g., room temperature, humidity, etc.), and prescribed constraints (e.g., the scheduler prescribing a fan speed, cooling power, etc.). In all cases, a prescribed constraint has the lowest priority. As an example, a room temperature operational constraint may override an evaporator fan speed prescription/cooling power draw prescription. An as another example, a vessel pressure safety constraint may override an environmental constraint such as, for example, a room temperature setpoint. Various other hierarchies may be defined and followed.

In some embodiments, a facility coordinator 115 or a scheduler 105 may provide rapid prototyping and real-time data analysis via cloud access to all sensor or process data. In some embodiments, custom user privilege levels can be set at the application level to ensure safe and secure cloud access. In some embodiments, secure buffering protocols may be used to ensure synchronization between the facility coordinator and the scheduler 105.

In some embodiments, a facility coordinator 115 or a scheduler 105 may implement hierarchical set-points, set-point inequalities, or set-point ranges to safely control individual components, controllable devices, or sensors. For example, an energy strategy may request a specific speed for an evaporator fan, but the control system must override this request if freezer temperatures reach a user-defined limit.

In some embodiments, virtual sensors may be used. In some embodiments, a user can define the composition of multiple physical sensors or external data to create a virtual sensor. A virtual sensor, for example, can be used in any scenario in which a physical sensor can be used, such as triggering alerts or controlling system processes. For example, suction pressure, discharge pressure and compressor power may be transformed (e.g., using a mathematical transformation) to create a virtual sensor that represents the thermal power and efficiency of the compressor. In some embodiments, the cooling efficiency may include the thermal work (e.g., heat absorbed by the evaporators) relative to electrical work over a period of time. Another virtual sensor, for example, may describe the cooling power (e.g., the heat removed) provided by a given evaporator or set of evaporators via a mathematical transformation based on a model that is a function of evaporator fan speed, air temperature, evaporator coil temperature, coolant flow rate through the evaporator, relevant equipment properties, or coolant properties, or other relevant physical properties. An alert, for example, can be created to notify operations when compressors are underperforming and need maintenance.

In some embodiments, multi-input and/or multi-output process control can be implemented at the facility coordinator. For example, a user can define a custom control process which combines multiple sensors (e.g., including virtual sensors) to control multiple outputs via user defined control methods such as PIDs and deadbands. For example, a custom control process can set facility electrical load by combining sensors throughout the plant and dynamically adjusting multiple components of the refrigeration system simultaneously.

Figure 3:
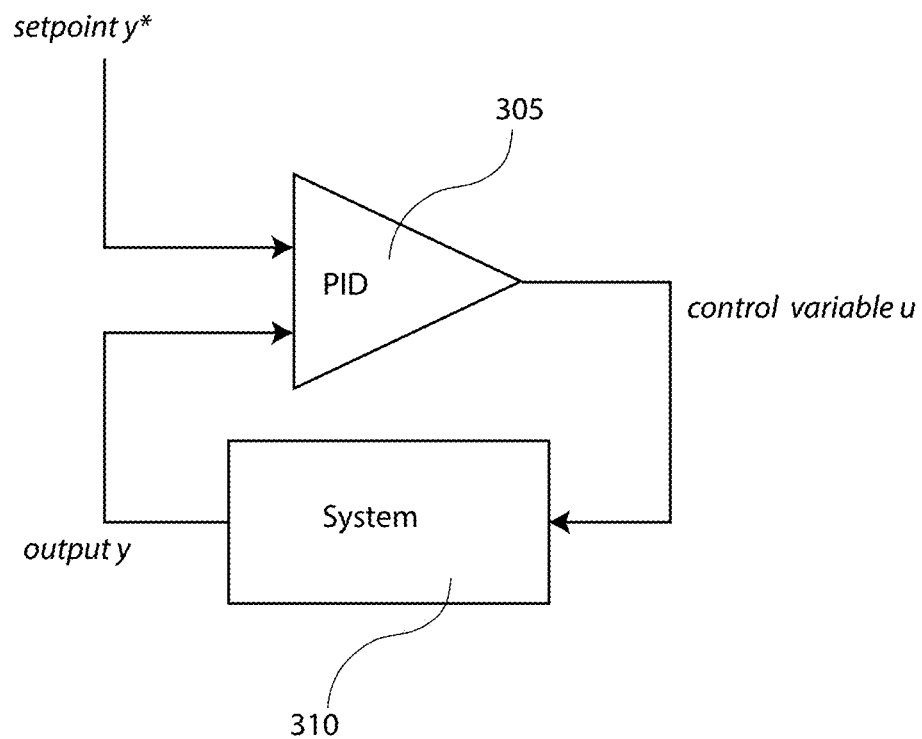
FIG. 3 is an example schematic of an existing PID control system.

An example schematic of an existing control system is shown in the FIG. 3. In this example, a desired setpoint y* (e.g. temperature, humidity, etc.) is given, and fed into the existing PID controller 305 (proportional-integral-derivative controller), along with the output y from a physical system 310. The PID controller 305 may perform a mathematical operation on the setpoint y* and the physical system output y, and produces control variable u, which is the effort to be applied to the system.

This policy is effective in theory, assuming that the existing control system does a good job ensuring that the output y matches the desired setpoint y*. There are a number of situations where this policy may be subpar. For example, the PID controller 305 may be subpar when the existing control system simply is not tuned well, and therefore does a poor job of matching output y to setpoint y* (e.g. output y oscillates aggressively whenever the setpoint is changed). As another example, a PID controller 305 may be subpar when one desires not a y setpoint, but rather a control variable u setpoint, for example, that is, one wishes to directly manipulate the control effort or other state of the system rather than the system output y.

Some embodiments described in this disclosure may manipulate the setpoint of an existing controller to produce the desired results.

Figure 4:
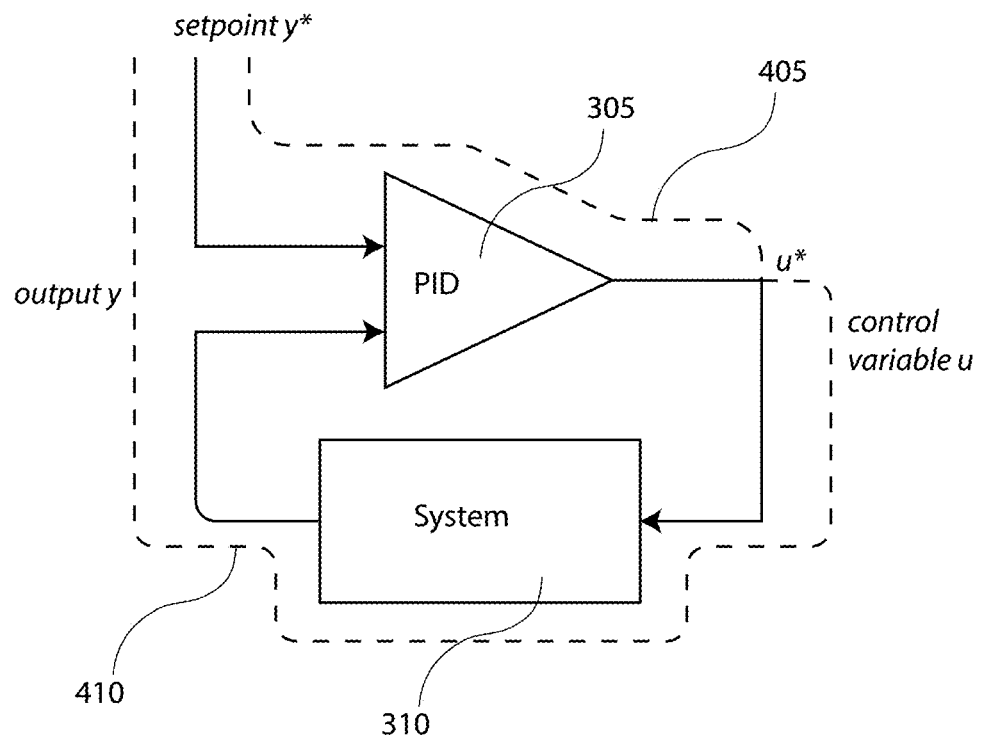
FIG. 4 is an example schematic of a PID control system according to some embodiments.

FIG. 4 is an example schematic of a PID controller 305 according to some embodiments. The goal may be to set the system to setpoint y* with a PID controller 305 that controls control variable u. The PID controller 305 may be considered inverted, for example, as shown in dashed line 405. An external controller, for example, can mathematically infer setpoint y* from variable u* by reversing the operation inside the PID controller 305. This may, for example, require an assumption about the output y (e.g. that it is constant, linear, etc.).

In some embodiments, the system model physics may be inverted (e.g., line 410). The PID dynamics, for example, may also be converted. In some embodiments, a setpoint can be set first by the PID controller 305, which may try to get the output y as close as possible. In this example, the temperature is not controlled the control variable u (e.g., the control effort) is controlled. Rather than infer an effort (e.g., variable u) to get to a setpoint, a temperature can be inferred to get an effort. An external controller, for example, can mathematically infer setpoint y* from variable u* by simulating the system using a quantitative physics model. This may, for example, require making the assumption that the existing PID is ideal (so that setpoint y*=setpoint y).

In some embodiments, a controller may choose to switch between the strategy of reversing the PID operation and reversing the physics model.

Figure 5:
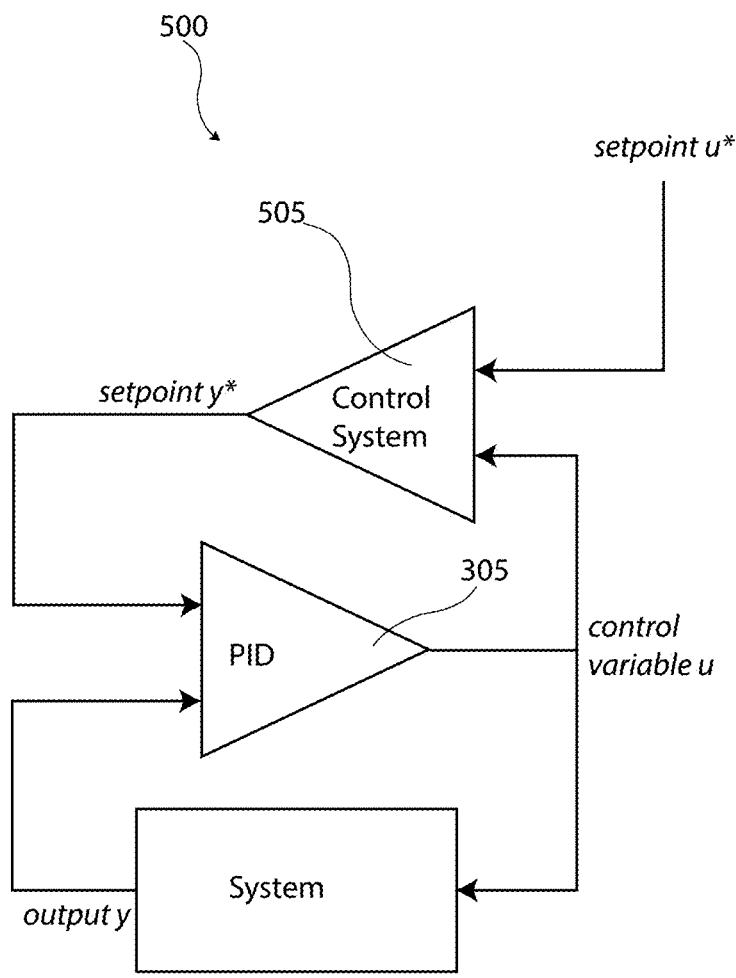
FIG. 5 is an example schematic of a PID control system according to some embodiments.

FIG. 5 is an example schematic of a PID control system 500 according to some embodiments. In this example, a control system 505 may be coupled with the PID controller 305 and may receive feedback from the output of the PID controller 305: control variable u. The control system 505 can input setpoint u* and control variable u. In some embodiments, the control system 505 may be a PID controller, a model predictive controller, or another controller.

In some embodiments, this example may include a combination of the examples shown in FIG. 4 and/or FIG. 3 For example, the PID control system 500 can be, for example, a model predictive control (MPC) using either the existing PID controller 305 (to implement DIP), or the system model physics (to implement PMS), making the appropriate assumptions mentioned above.

In some embodiments, the control system 505 can include an MPC, treating its model as the combined system-PID model. In this example, the existing control system may be a PID control system.

Figure 6:
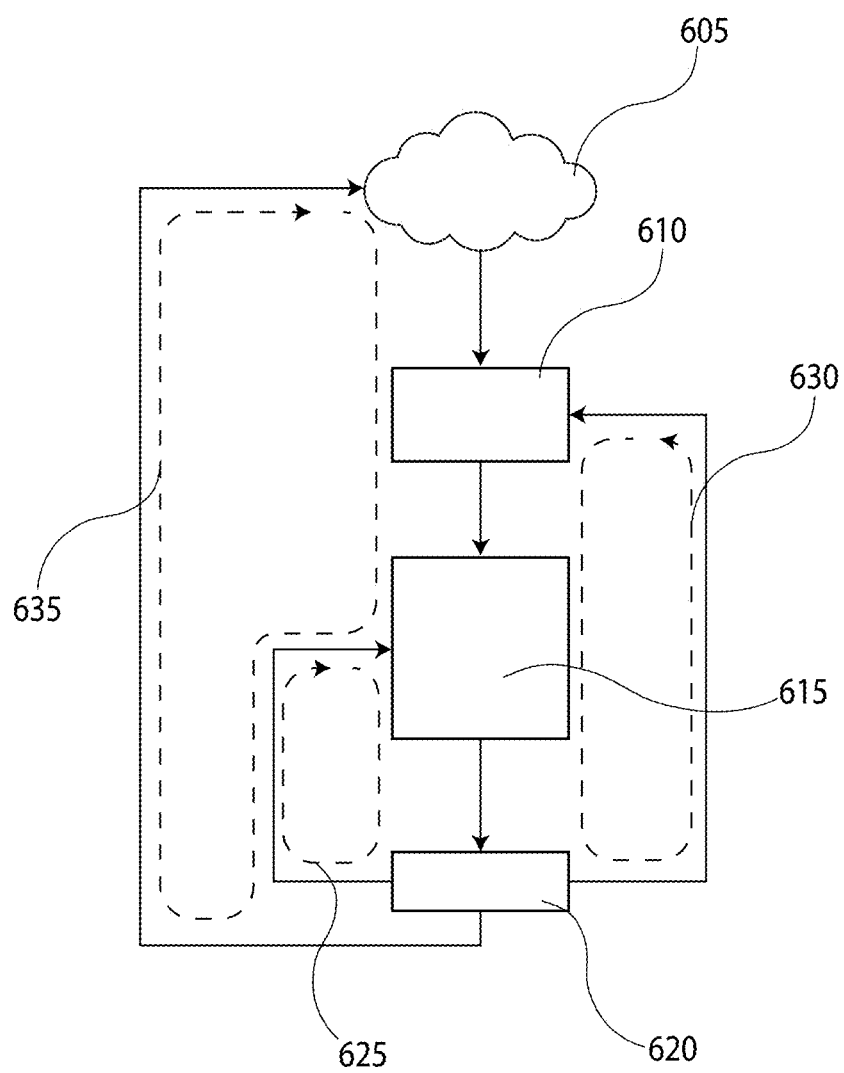
FIG. 6 is an example schematic of a PID control system according to some embodiments.

FIG. 6 is an example schematic of a bypass control system 600 according to some embodiments. The cloud scheduler 605 may include the scheduler 105. The bypass controller 610 (e.g., an ATLAS controller) may include facility controller 115 or the control system 505. The existing control system 615 may include all or a subset of the devices and/or controllers of an industrial facility 110.

Three control loops are shown. The control loop 625, for example, may be an existing PID control loop such as, for example, as shown in FIG. 3. The control loop 625, for example, may be a responsive control loop. In the control loop 625, for example, the existing controller may output voltage signals and input environmental signals (e.g., temperature, pressure, motor speed, etc.) from a sensor.

The control loop 630, for example, may be the control loop 630 shown in FIG. 5. In the control loop 630, for example, the bypass controller 610 (e.g., an ATLAS controller) may setpoint input environmental signals (e.g., temperature, pressure, motor speed, etc.) from a sensor and/or output a temperature setpoint. The control loop 630, for example, may be less responsive than the control loop 625, but more responsive than the control loop 635.

The control loop 635 may execute on a server in the cloud or on a local server. The control loop 635, for example, may be slow to respond, may include various power optimizations, and/or may operate on complex models. In the control loop 635, for example, the cloud scheduler 605 may output power draw data or signals, and/or input environmental signals (e.g., temperature, pressure, motor speed, etc.) from a sensor.

In some embodiments, an optimized power draw schedule can be computed by the cloud scheduler 605, which may be a local or cloud-based server. A prescription can be passed down to the bypass controller 610, which can convert the power draw into a temperature setpoint which the existing control system 615 can accept via one of the methods described above. The bypass controller 610, for example, may push this temperature setpoint to the existing control system 615, which may reside, for example, on an existing controller at a facility. The existing control system 615, for example, may then output a voltage signal to equipment within the facility, which may alert its state, and has the effect of drawing a possibly different amount of electrical current. In the meantime, the control loop 625, which is not within the direct control of either the bypass controller 610 or the cloud scheduler 605, may continue to run to match the temperature setpoint which was provided by the bypass controller 610.

In some embodiments, if the model being used by the bypass controller 610 is accurate, then the resulting power draw will match the prescription power draw passed down from the cloud scheduler 605 to the bypass controller 610. Any disturbances in the equipment that might cause deviations between the predicted state trajectory and the actual trajectory may manifest as differences in the feedback signals, which the bypass controller 610 may read and compare to its internal model to determine how it needs to change its temperature setpoint to maintain the power draw equal to the power draw setpoint.

In some embodiments, the control loop 630 may be used to reduce power spikes in an industrial refrigeration system (e.g., as shown in FIG. 2). These power spikes, for example, may be used to handle random disturbances from opening of refrigerator doors by bypassing disturbances to room temperature.

In some embodiments, the cloud scheduler 605 can send the bypass controller 610 a power draw setpoint. The bypass controller 610 can determine the optimal cooling schedule for a refrigerator based on the power draw setpoint to maintain temperature bounds using any type of mathematical model (e.g., a quantitative thermal model). When the bypass controller 610 pushes the corresponding optimal temperature setpoint schedule to the existing control system 615, any thermal disturbance (e.g., from unforeseen effects like heat flux through doors) will cause the control loop 635 to crank the refrigerators to match the temperature setpoint. This situation may not match the model at the bypass controller 610, since the temperature bounds are wide enough to accommodate these fluctuations, and doing so will remove the electrical demand spike that would be required if the temperature setpoint were to be followed in a conformist manner.

In some embodiments, the cloud scheduler 605 may push an electrical draw schedule, which can only be applied by virtual control in a situation where the refrigerator already has an immutable control system installed. This electrical draw schedule may be passed to the bypass controller 610, which determines a temperature setpoint schedule to begin applying to the system in order to effect the desired electrical draw schedule and sends the temperature setpoint to the existing control system 615.

In some embodiments, the bypass control system can be used to reduce power spikes in an industrial refrigeration system due to random disturbances from opening of refrigerator doors by bypassing disturbances to low pressure receiver (LPR) pressure and/or level.

In some embodiments, the cloud scheduler 605 can determine the optimal cooling schedule for a refrigerator by considering how much electricity may be used to maintain bounds using a mathematical model such as, for example, a quantitative thermal model. When the bypass controller 610 pushes the corresponding optimal pressure setpoint schedule to the existing control system 615, any thermal disturbance (from unforeseen effects like heat flux through doors, expansion valves opening, defrosts, etc.) may cause the control loop 625 to crank the compressor to maintain the vessel pressure/level setpoints. This situation is not what the scheduler had in mind, since the pressure/level bounds are wide enough to accommodate these fluctuations, and doing so will remove the electrical demand spike that would be required if the setpoints were to be followed in a conformist manner.

In some embodiments, the cloud scheduler, can provide the bypass controller 610 an electrical draw schedule. The bypass controller 610 may determine a pressure/level setpoint schedule to send to the existing control system 615 to apply to the system in order to effect the desired electrical draw schedule.

Figure 7A:
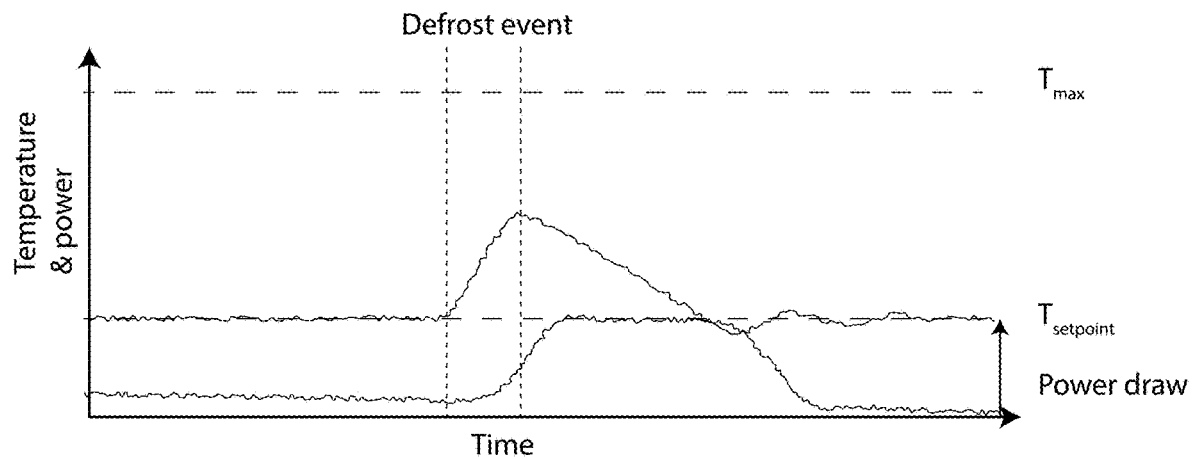
FIG. 7A is a plot of temperature and FIG. 7B is a plot of power during a defrost cycles for systems with and without the bypass controller.
Figure 7B:
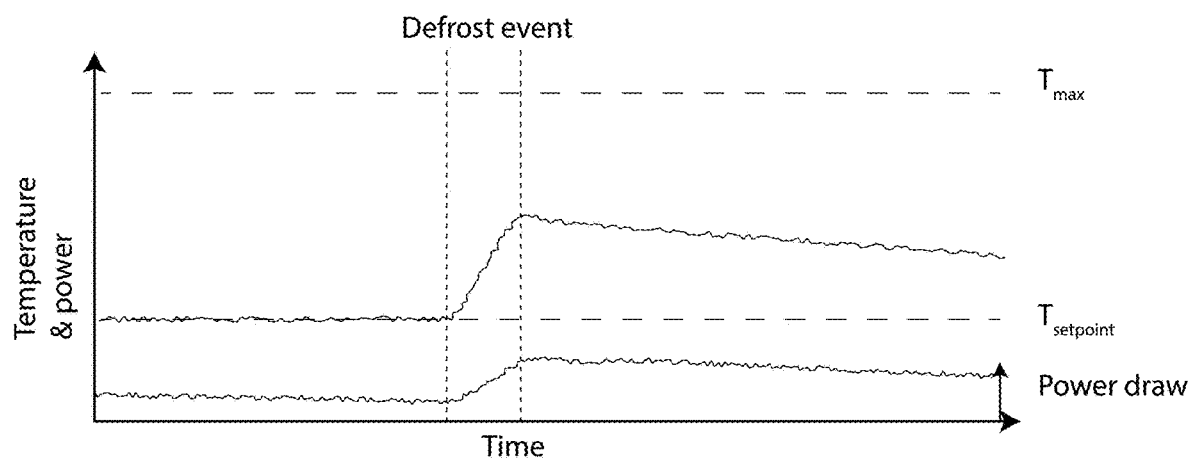

FIG. 7A is a plot of temperature and FIG. 7B is a plot of power during a defrost cycles for systems with and without the bypass controller 610. In the upper plot (without the bypass controller 610), whenever a defrost event occurs (e.g., an unexpected defrost event) the existing control system 615 can detect that the room temperature is higher than the temperature setpoint (e.g., the setpoint line 715). The defrost event may be any event that injects a great deal of heat into the system to melt ice on the evaporator. For example, the existing controller may sense the change in temperature and blasts the refrigerators to attempt to compensate and bring the temperature to the setpoint.

In the lower plot, with the bypass controller 610, the increase in temperature is accepted so long as it is below a maximum temperature. In response, the system may not attempt to immediately drive the temperature back to the temperature setpoint 715 and not causing a power draw spike associated with bringing the temperature back down to the setpoint. In this example, the temperature stays in bounds and the power draw is lowered. In some embodiments, if the temperature within the refrigerator approaches or exceeds $T_{max}$ the bypass controller 610 may require the existing controller to turn on the cooler to ensure the temperature stays within bounds.

Figure 8A:
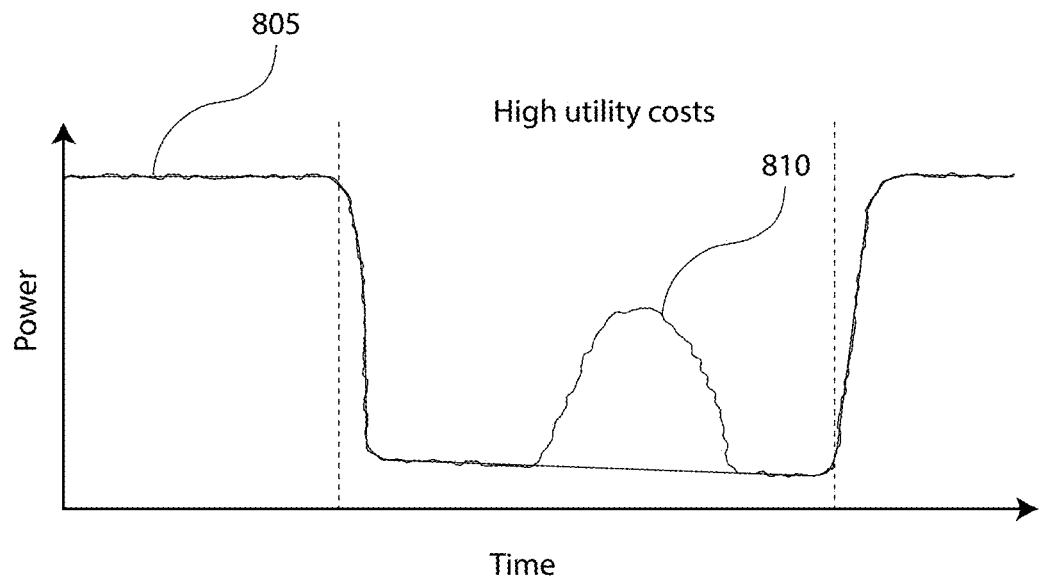
FIG. 8A is a plot of the power draw and FIG. 8B is a plot of the temperature of a refrigerator when the refrigerator is used as a thermal battery without control system bypassing according to some embodiments.
Figure 8B:
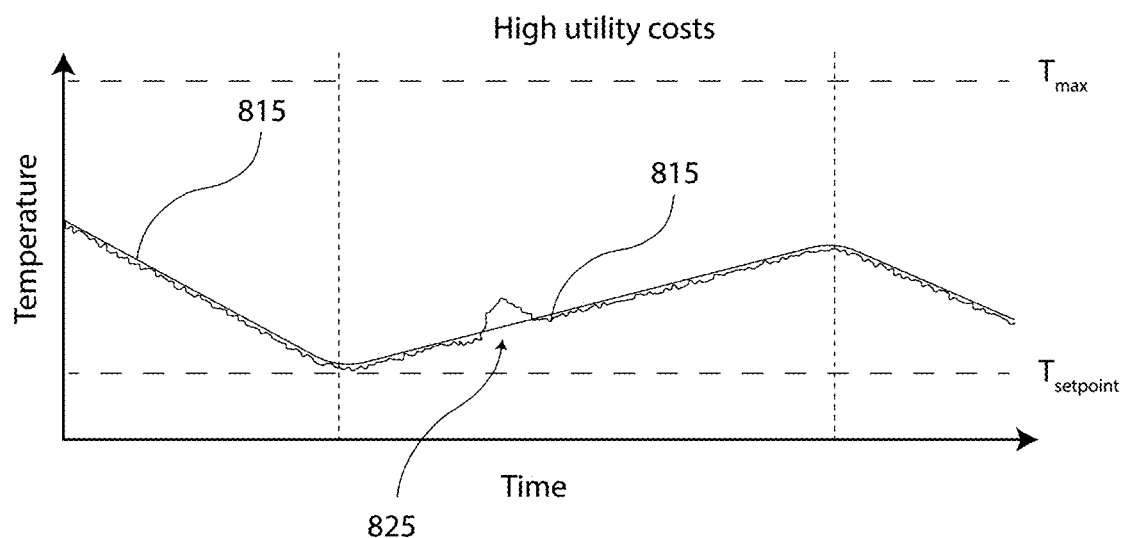

FIG. 8A is a plot of the power draw and FIG. 8B is a plot of the temperature of a refrigerator when the refrigerator is used as a thermal battery without control system bypassing according to some embodiments. In some embodiments, unexpected heat flux into a freezer/cooler/refrigerator can be mitigated by using the room temperature as a thermal battery.

In some embodiments, a freezer/cooler/refrigerator can operate under an optimized control schedule to minimize utility charges due to high energy usage and/or high energy prices during specific times of the day These specific times can include any time period such as, for example, between 12 PM to 5 PM.

In some embodiments, the system may determine that the price for electricity between certain hours (e.g., the hours of 12 PM and 5 PM) is very high (or any other time period as determined by the system or input by a user). An optimal schedule can be determined based on typical operation of the refrigerator, which is showed by line 805 in FIG. 8A. The schedule provided by the cloud scheduler may prescribe more power to run the refrigerator during inexpensive times, and less power during expensive times. The cloud scheduler may calculate this based on knowledge that the freezer temperature can maintain within allowable bounds (shown as black dashed lines) such as, for example, between about 20° F. and 0° F., which it can compute using the mathematical model of the freezer. In some embodiments, the cloud scheduler may not have the ability to control the freezer power draw directly, and instead only has control over the temperature setpoint, shown in line 815 in FIG. 8B.

In order to consume the desired utility power, for example, a mathematical model of the freezer physics can be used to relate the power consumed to the resulting freezer temperature as a function of time. The result is, assuming the model is a good representation of the real-world physics, the refrigerator consumes the desired amount of power from the utility. However, no model is 100% accurate, so there may be discrepancies between the temperature setpoint, and the actual freezer temperature (line 820 in FIG. 8B), and consequently differences in the scheduled power draw and the actual power draw (line 810 in FIG. 8A). In this example, the source of discrepancy between the model and the real-world reality is that an unforeseen heat flux occurred, which may cause the actual freezer temperature to rise considerably. Since the freezer runs on a temperature control system, this temperature increase causes a corresponding increase in the actual power drawn from the utility as shown in line 810 in FIG. 8A. This is unacceptable, since this increase in power draw is untimely and will cost us greatly.

In some embodiments, a control bypass system can compensate for this by forming a relationship between the temperature and power draw using the control system model, rather than using the physical model (which may be prone to unforeseen disturbances). With Control System Bypassing, instead of scheduling a temperature setpoint schedule ahead-of-time, the desired power draw (or any other parameter) may be scheduled ahead-of-time instead, and one of the methods described earlier in this document works to command an appropriate temperature setpoint in order to bring about the desired amount of power draw from the freezer system.

In some embodiments, a disturbance 825 may create a non-negotiable change in the physics, which will either impact the power draw, the temperature, or both. In some embodiments, control system bypassing may choose which of these outcomes is most favorable. The following figure shows the same graphs as before, but with control system bypassing. In this example, when the unforeseen heat flux occurs (disturbance), the effects of that disturbance are absorbed entirely into warming the freezer, rather than drawing more power from the utility during the expensive time window.

Figure 9A:
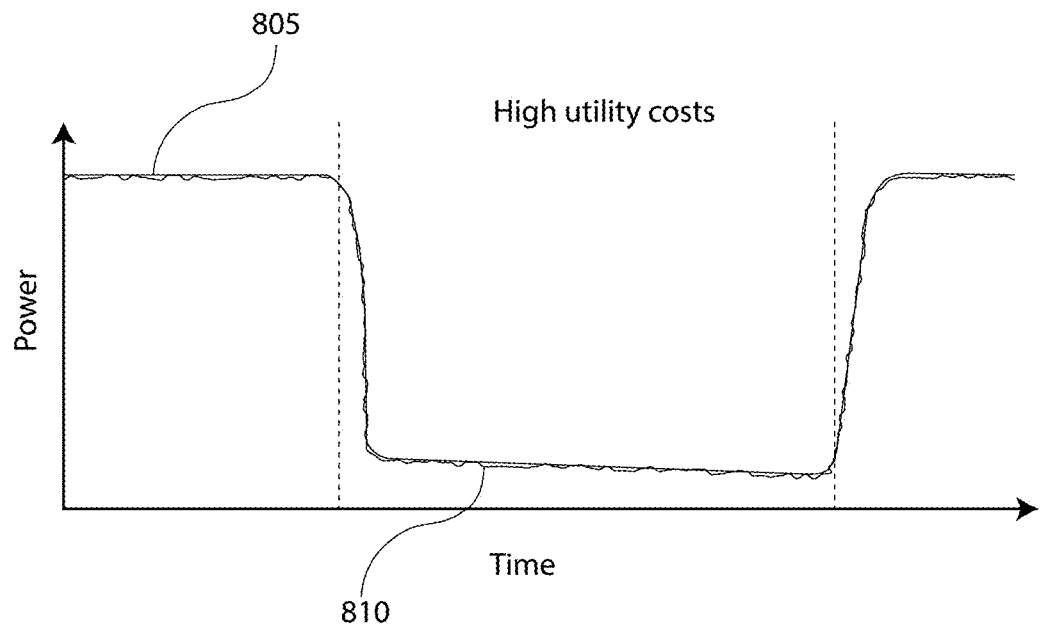
FIG. 9A is a plot of the power draw and FIG. 9B is a plot of the temperature of a refrigerator when the refrigerator is used as a thermal battery with control system bypassing according to some embodiments.
Figure 9B:
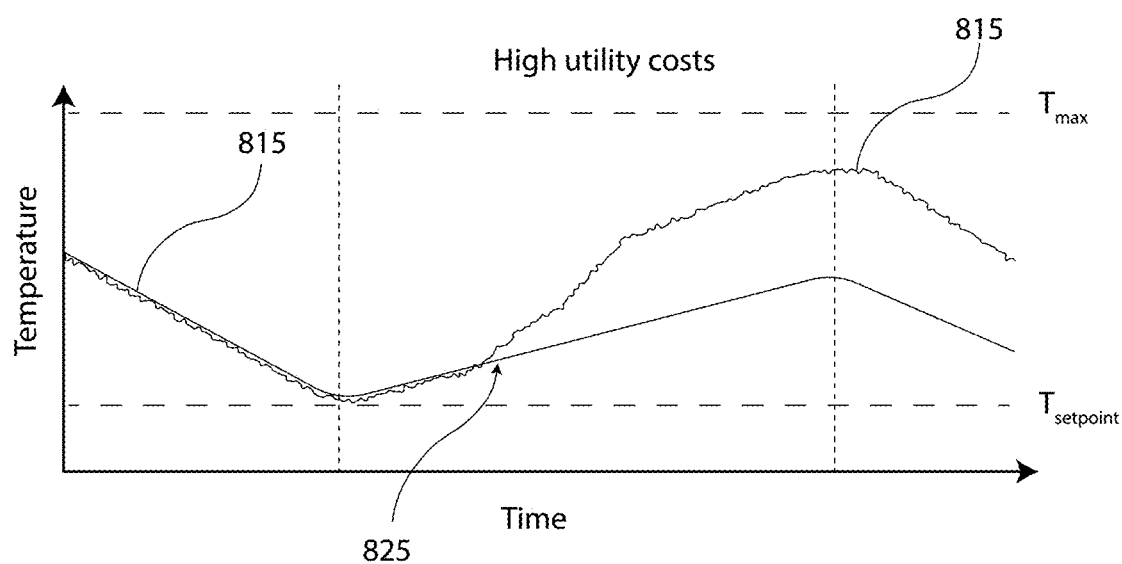

FIG. 9A is a plot of the power draw and FIG. 9B is a plot of the temperature of a refrigerator when the refrigerator (or cooler) is used with control system bypassing according to some embodiments. The refrigerator may, for example, act as a thermal battery.

In some embodiments, the cloud scheduler may compute an optimized schedule assuming an idealized model that has a lower power draw during times with high utility prices. The resultant power draw is reduced dramatically during the expensive portion of the day. For example, during this time, the compressor may draw power to reduce the pressure of the vessel when necessary, and it may do so by running a control system on the vessel pressure. In some embodiments, to produce the desired utility power draw, the cloud controller may use a mathematical model to determine the physical relationship between the pressure of the vessel and the requisite compressor power draw, and then push that pressure setpoint schedule to the control system to try to match the actual power draw to the desired power draw.

In some embodiments, an unexpected disturbance may come about, causing the pressure in the vessel to increase more than expected by the model. When this happens, the vessel pressure may rise, and the control system mat kick on the compressor to compensate, which may use utility power during the expensive part of the day. With control system bypassing, for example, a desired power draw schedule may be determined as before, but the model of the control system (rather than the physics of the vessel pressure and condenser) can be used to relate the pressure setpoint to the power draw used by the compressor. The relevant figures look identical to the two previous figures, except the temperature axis is replaced with pressure.

As shown in FIG. 9B, the temperature 815 remains within the refrigerator is kept within the temperature thresholds.

Figure 10:
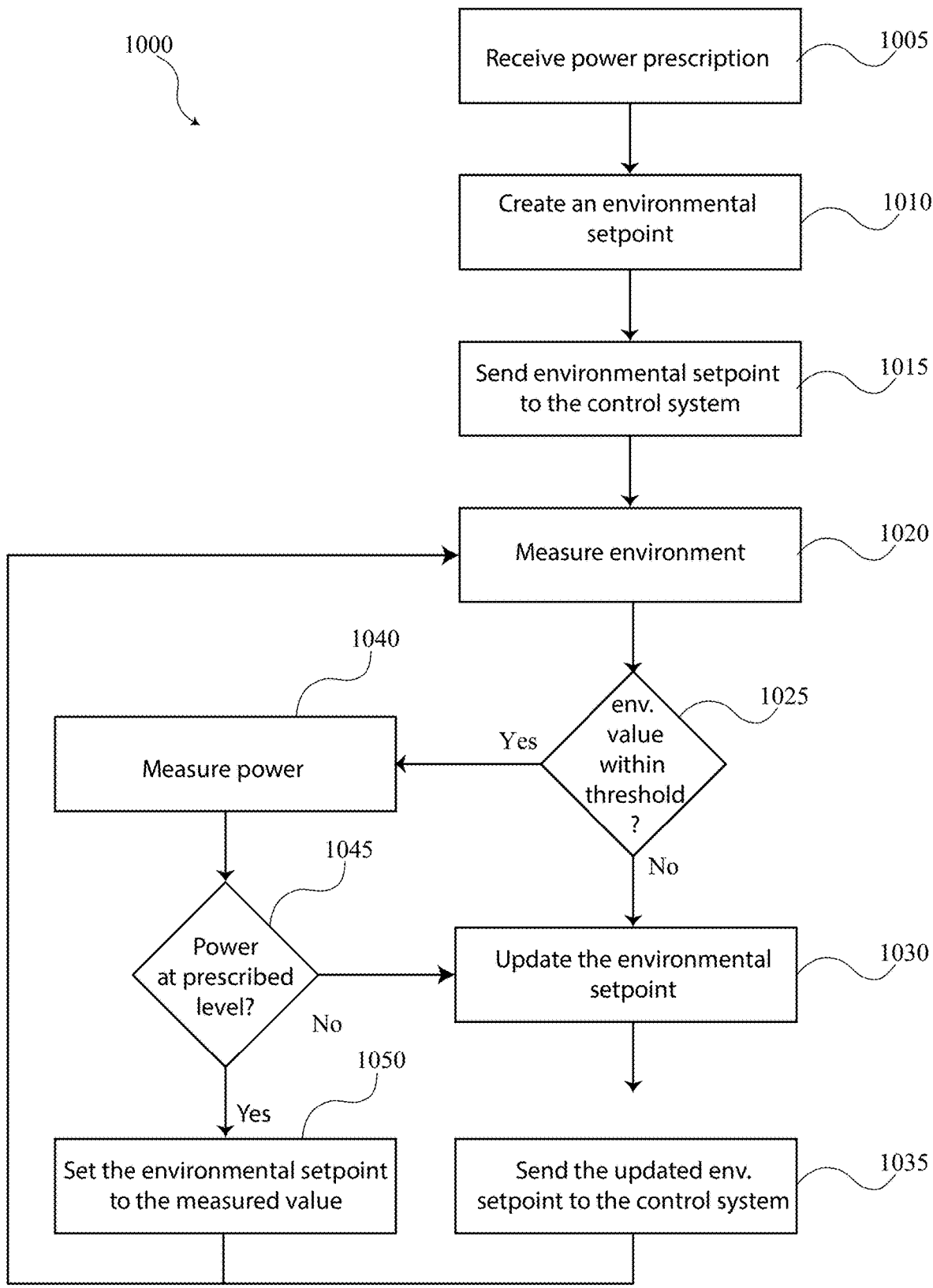
FIG. 10 is a flowchart of a process for bypass control system according to some embodiments.

FIG. 10 is a flowchart of a process 1100 for bypass control system according to some embodiments. The process 1000 may include additional blocks, some blocks may be skipped or may not be used, and/or the blocks may occur in any order.

Process 1000 begins at block 1005. The bypass control system (e.g., facility coordinator 115) may receive a power draw prescription. The power draw prescription, for example, may be received from a remote server such as, for example, from scheduler 105. The power draw prescription, for example, may include a power level for one or more items of equipment in a facility such as, for example, a cold storage facility. The power draw prescription, for example, may include a power profile that varies over time. The power draw prescription, for example, may include a power profile that is lower during times of high energy demand and/or high energy prices. The power draw prescription, for example, may include a power profile that is higher during times of low power demand and/or low energy prices. The power draw prescription, for example, may apply to all the items of equipment at a facility, a subset of items of equipment, or one item of equipment at a facility.

At block 1010, the process 1000 determines or creates an environmental setpoint for one or more items of equipment based on the power prescription. The environmental setpoint, for example, may include a temperature setpoint, a humidity setpoint, a pressure setpoint, etc. The environmental setpoint, for example, may not include energy setpoint or a power setpoint. The environmental setpoint may, for example, include a temperature setpoint for a cooler. The temperature of the cooler, for example, may be controlled by a number of different items of equipment. The environmental setpoint may be created based on various models of the items of equipment and/or the facility that relate environmental parameters with power consumption.

At block 1015 the environmental setpoint can be sent to a cold storage facility system controller and/or one or more items of equipment. The cold storage facility system controller, for example, may include a PID controller or a similar controller. The cold storage facility system controller, for example, may include one or more of a vessel controller 130, an evaporator controller 135, a condenser controller 140, a pump controller 145, and/or a channel gate controller 150, etc. The cold storage facility system controller, for example, may include a cooler controller.

At block 1020 environmental parameters within the cold storage facility and/or one or more of the items of equipment may be measured from one or more sensors. These sensors may include a temperature sensor 170, a vessel pressure sensor 175, a condenser pressure sensor 180, a compressor oil pressure sensor 185, a vessel level sensor 190, and/or other sensor 195.

In some embodiments, the sensor data and/or actual power consumption data may be used to update the model used by the bypass controller to revise the model used in block 1010 to create the environmental setpoint from a power draw prescription. An updated model may be created and/or updated at the bypass controller and/or the cloud controller.

At block 1025, if the bypass controller or the cold storage facility system controller determines the environmental parameter is not below the upper threshold value or above the lower threshold value, the process 1000 may proceed to block 1030. If the bypass controller or the cold storage facility system controller determines the measured environmental data is above or near the upper threshold and/or below or near the lower threshold the process 1000 may proceed to block 1040 In some embodiments, a single threshold may be used such as, for example, an upper temperature threshold.

For example, the upper threshold for a temperature threshold may be about 0° C. and the lower threshold for a temperature threshold may be about −20° C. As another example, the upper threshold for a temperature threshold may be about −5° C. and the lower threshold for a temperature threshold may be about −15° C.

At block 1030, an updated environmental setpoint may be produced based, for example, on the measured power and/or the measured environmental parameter. Following block 1025, the updated environmental setpoint may be determined to bring the environment back within the upper threshold value and the lower threshold value.

At block 1035 the updated environmental setpoint may be sent to the cold storage facility system controller and/or one or more items of equipment.

At block 1040 the power draw power level may be measured for the one or more items of equipment in the facility such as, for example, as specified in the power draw prescription. The power draw measurement, for example, may be received at the bypass controller from an external source and/or from an power sensor. The power draw measurement may include the instantaneous power draw, an average power draw over a predetermined period of time, or any type of power draw measurement, etc.

At block 1045, if the power draw level is not at the prescribed level, then process 1000 proceeds to block 1030 and the environment setpoint may be adjusted to drive the power draw level lower.

If the power draw level is at the prescribed level, then process 1000 proceeds to block 1050 where the environmental setpoint may be set at the environmental value measured at block 1020. After block 1050, process 1000 may proceed back to block 1020.

FIG. 11 is a flowchart of a process 1100 for bypass control system according to some embodiments. The process 1100 may include additional blocks, some blocks may be skipped or may not be used, and/or the blocks may occur in any order.

Process 1100 begins at block 1105. The bypass control system (e.g., facility coordinator 115) may receive a power draw prescription. The power draw prescription, for example, may be received from a remote server such as, for example, from the scheduler 105. The power draw prescription, for example, may include a power level for one or more items of equipment in a facility such as, for example, a cold storage facility. The power draw prescription, for example, may include a power profile that varies over time. The power draw prescription, for example, may include a power profile that is lower during times of high energy demand and/or high energy prices. The power draw prescription, for example, may include a power profile that is higher during times of low power demand and/or low energy prices. The power draw prescription, for example, may apply to all the items of equipment at a facility, a subset of items of equipment, or one item of equipment at a facility.

At block 1110 one or more environmental parameters within the cold storage facility and/or one or more of the items of equipment may be measured from one or more sensors. These sensors may include, for example, a temperature sensor 170, a vessel pressure sensor 175, a condenser pressure sensor 180, a compressor oil pressure sensor 185, a vessel level sensor 190, and/or other sensor 195.

At block 1115 the power draw power level may be measured for the one or more items of equipment in the facility (or the entire facility) such as, for example, as specified in the power draw prescription. The power draw measurement, for example, may be received at the bypass controller from an external source and/or from an power sensor. The power draw measurement may include the instantaneous power draw, an average power draw over a predetermined period of time, or any type of power draw measurement, etc.

At block 1120, an environmental setpoint for one or more items of equipment can be determined and/or created from a mathematical model based on the prescription, the measured power draw, and/or the measured environmental parameters. The environmental setpoint, for example, may include one or more of a temperature setpoint, a humidity setpoint, a pressure setpoint, etc. The environmental setpoint, for example, may not include an energy setpoint or a power setpoint. The environmental setpoint, for example, may include a temperature setpoint for a cooler. The temperature of the cooler, for example, may be controlled by a number of different items of equipment. The environmental setpoint may be created based on one of various models of the items of equipment and/or the facility that relate environmental parameters with power consumption.

At block 1125, if the bypass controller or the cold storage facility system controller determines the measured environmental parameter is not within upper or lower threshold values, the process 1100 may proceed to block 1130. If the bypass controller or the cold storage facility system controller determines the measured environmental parameter is above or near the upper threshold and/or below or near the lower threshold, the process 1100 may proceed to block 1135. In some embodiments, a single threshold may be used such as, for example, the upper temperature threshold.

For example, the upper threshold for a temperature threshold may be about 0° C. and the lower threshold for a temperature threshold may be about −20° C. As another example, the upper threshold for a temperature threshold may be about −5° C. and the lower threshold for a temperature threshold may be about −15° C.

At block 1130, an updated or revised environmental setpoint may be produced. The updated environmental setpoint may be determined, for example, to bring the environment back below or further below the upper threshold value or above or further above the lower threshold value. After block 1130, process 1100 may proceed to block 1145. At block 1145 the updated or revised environmental setpoint may be sent to the cold storage facility system controller and/or one or more items of equipment.

At block 1135, if the measured power draw level is not at the prescribed level, then process 1100 proceeds to block 1145. At block 1145 the environmental setpoint determined at block 1120 may be sent to the cold storage facility system controller and/or one or more items of equipment. At block 1135, if the measured power draw level is at the prescribed level, then the process 1100 proceeds to block 1140 and the environment setpoint is set to the measured environmental parameter. At block 1145 the environmental setpoint may be sent to the cold storage facility system controller and/or one or more items of equipment.

Figure 12:
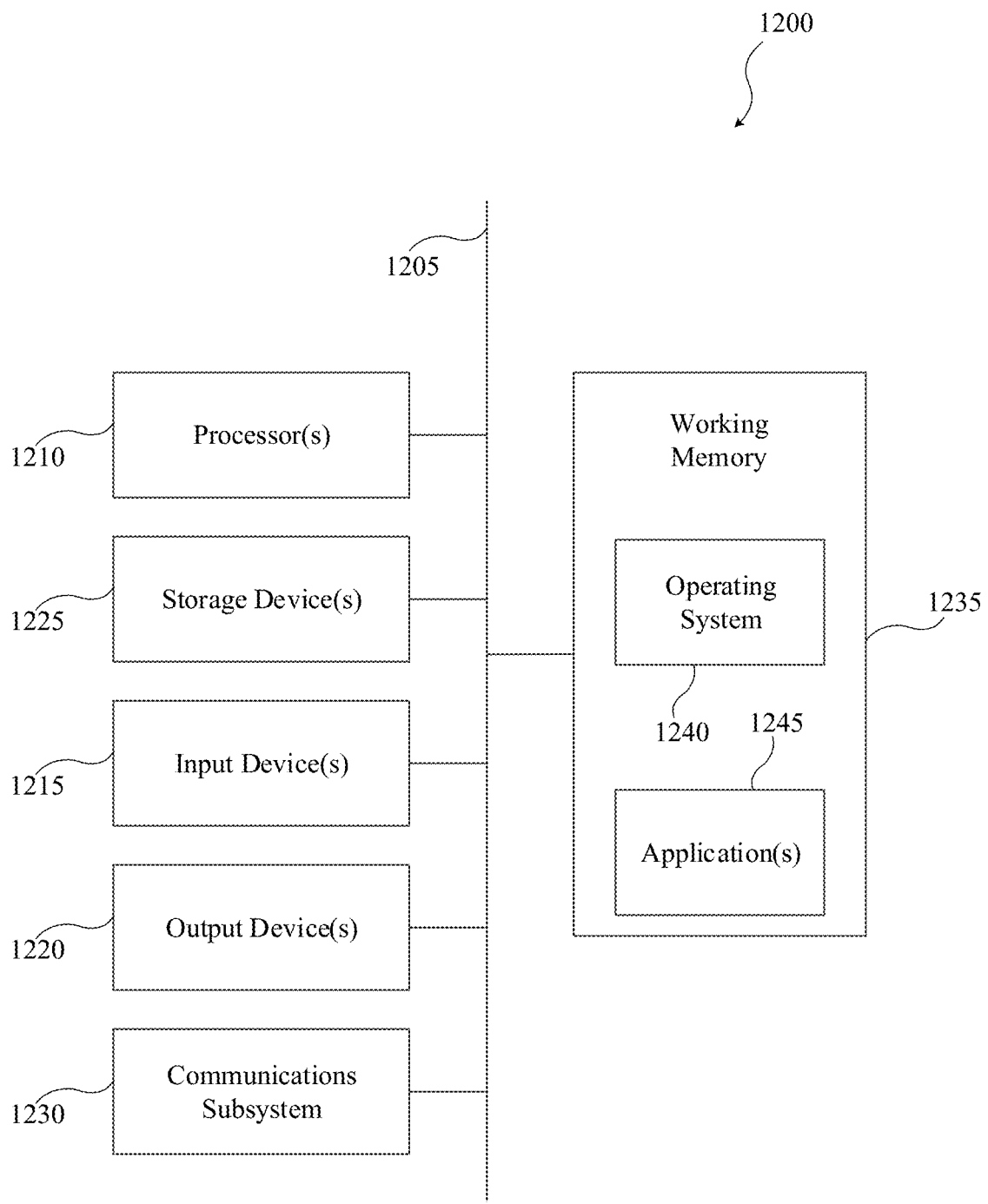
FIG. 12 shows an illustrative computational system for performing functionality to facilitate implementation of embodiments described herein.

The computational system 1200, shown in FIG. 12 can be used to perform any of the embodiments of the invention. As another example, computational system 1200 can be used to perform any calculation, identification and/or determination described in this document such as, for example, process 1000 or process 1100. Computational system 1200 includes hardware elements that can be electrically coupled via a bus 1205 (or may otherwise be in communication, as appropriate). The hardware elements can include one or more processors 1210, including without limitation one or more general-purpose processors and/or one or more special-purpose processors (such as digital signal processing chips, graphics acceleration chips, and/or the like); one or more input devices 1215, which can include without limitation a mouse, a keyboard and/or the like; and one or more output devices 1220, which can include without limitation a display device, a printer and/or the like.

The computational system 1200 may further include (and/or be in communication with) one or more storage devices 1225, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 1200 might also include a communications subsystem 1230, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 1230 may permit data to be exchanged with a network (such as the network described below, to name one example), and/or any other devices described herein. In many embodiments, the computational system 1200 will further include a working memory 1235, which can include a RAM or ROM device, as described above.

The computational system 1200 also can include software elements, shown as being currently located within the working memory 1235, including an operating system 1240 and/or other code, such as one or more application programs 1245, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1225 described above.

In some cases, the storage medium might be incorporated within the computational system 1200 or in communication with the computational system 1200. In other embodiments, the storage medium might be separate from a computational system 1200 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 1200 and/or might take the form of source and/or installable code, which, upon compilation and/or installation on the computational system 1200 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A system for controlling cold storage equipment at an industrial cold storage facility, the system comprising:
    a cloud scheduler located in a location remote from the industrial cold storage facility, the cloud scheduler creates a power draw prescription for one or more items of cold storage equipment at the industrial cold storage facility, and the cloud scheduler communicates the power draw prescription to the cold storage facility, the power draw prescription includes a desired power draw level for the one or more items of cold storage equipment at the industrial cold storage facility, wherein the power draw prescription is time varying; and
    a bypass controller located at the industrial cold storage facility that receives a power draw prescription from the cloud scheduler, produces an environmental setpoint for the one or more items of cold storage equipment based on the power draw prescription, and outputs the environmental setpoint to a device controller or a system controller,
    wherein the device controller or the system controller controls the one or more items of cold storage equipment at the industrial cold storage facility based on the environmental setpoint.

2. The system according to claim 1, wherein the one or more items of cold storage equipment comprises one or more of a motor, a valve, a vessel, an evaporator, a condenser, a pump, a compressor, a door, an underfloor heating element, a light, defrost equipment, a centrifuge, and/or a furnace.

3. The system according to claim 1, where the bypass controller
receives temperature data from a temperature sensor at a portion of the cold storage facility;
determines whether the temperature data has exceeded or is approaching a threshold temperature value for the portion of the cold storage facility; and
in the event the temperature data has exceeded or is approaching the threshold temperature value:
produces a second temperature setpoint; and
communicates the second temperature setpoint to the system controller.

4. The system according to claim 1, wherein the system controller or the device controller comprises a PID controller.

5. The system according to claim 1, wherein the environmental setpoint comprises a setpoint that does not include an energy setpoint or a power setpoint.

6. The system according to claim 1, wherein the environmental setpoint is time varying.

7. A method comprising:
receiving, at a bypass controller at an industrial cold storage facility, a power draw prescription from a remote server, the power draw prescription includes a desired power draw level for one or more items of cold storage equipment at the industrial cold storage facility, wherein the power draw prescription is time varying;
converting, at the bypass controller, the power draw prescription to a temperature setpoint for a portion of the cold storage facility based on a mathematical model of the one or more items of cold storage equipment; and
communicating the temperature setpoint to a cold storage facility system controller that is coupled with the one or more items of cold storage equipment,
wherein the cold storage facility system controller controls the one or more items of cold storage equipment at the industrial cold storage facility based on the temperature setpoint.

8. The method according to claim 7, wherein the one or more items of cold storage equipment comprises one or more of a motor, a valve, a vessel, an evaporator, a condenser, a pump, a compressor, a door, an underfloor heating element, a light, defrost equipment, a centrifuge, and/or a furnace.

9. The method according to claim 7, further comprising:
receiving, at the bypass controller, temperature data from a temperature sensor at the portion of the cold storage facility;
determining, at the bypass controller, whether the temperature data has exceeded or is approaching a threshold temperature value for the portion of the cold storage facility; and
in the event the temperature data has exceeded or is approaching the threshold temperature value:
producing a second temperature setpoint; and
communicating the second temperature setpoint to the cold storage facility system controller.

10. The method according to claim 7, further comprising:
receiving, at the cold storage facility system controller, temperature data from a temperature sensor at the portion of the cold storage facility;
determining, at the cold storage facility system controller, whether the temperature data has exceeded or is approaching a threshold temperature value for the portion of the cold storage facility; and
in the event the temperature data has exceeded or is approaching the threshold temperature value:
producing a second temperature setpoint; and
communicating the second temperature setpoint to the cold storage facility system controller.

11. The method according to claim 7, wherein the power draw prescription varies based on utility prices.

12. The method according to claim 7, wherein the cold storage facility system controller comprises a PID controller.

13. A non-transitory computer readable medium having instructions stored thereon for performing a method of:
receiving, at a bypass controller at an industrial cold storage facility, a power draw prescription from a remote server, the power draw prescription includes a desired power draw level for one or more items of cold storage equipment at the industrial cold storage facility, wherein the power draw prescription is time varying;
converting, at the bypass controller, the power draw prescription to a temperature setpoint for a portion of the cold storage facility based on a mathematical model of the one or more items of cold storage equipment; and
communicating the temperature setpoint to a cold storage facility system controller that is coupled with the one or more items of cold storage equipment,
wherein the cold storage facility system controller controls the one or more items of cold storage equipment at the industrial cold storage facility based on the temperature setpoint.

14. The non-transitory computer readable medium according to claim 13, wherein the one or more items of cold storage equipment comprises one or more of a motor, a valve, a vessel, an evaporator, a condenser, a pump, a compressor, a door, an underfloor heating element, a light, defrost equipment, a centrifuge, and/or a furnace.

15. The non-transitory computer readable medium according to claim 14, wherein the computer readable medium further includes instructions for:
receiving, at the bypass controller, temperature data from a temperature sensor at the portion of the cold storage facility;
determining, at the bypass controller, whether the temperature data has exceeded or is approaching a threshold temperature value for the portion of the cold storage facility; and
in the event the temperature data has exceeded or is approaching the threshold temperature value:
producing a second temperature setpoint; and
communicating the second temperature setpoint to the cold storage facility system controller.

16. A bypass controller in communication with a cloud controller and a device controller at an industrial cold storage facility, the bypass controller comprising:
a transceiver that receives data from a cloud scheduler located in a location remote from the industrial cold storage facility; and
a processor that:
receives a power draw prescription for one or more items of cold storage equipment at the industrial cold storage facility, the power draw prescription includes a desired power draw level for one or more items of cold storage equipment at the industrial cold storage facility, wherein the power draw prescription is time varying;
produces an environmental setpoint for the one or more items of cold storage equipment based on the power draw prescription; and
outputs the environmental setpoint to a device controller or a system controller, wherein the device controller or the system controller controls the one or more items of cold storage equipment at the industrial cold storage facility based on the environmental setpoint.

17. The bypass controller according to claim 16, wherein the processor outputs the environmental setpoint via the transceiver.

\* \* \* \* \*